United States Patent [19]

D'Aniello

[11] 3,826,011

[45] July 30, 1974

[54] PRE-SETTING TOOL GAUGE FOR SPINDLE MACHINES

[76] Inventor: Liborio Lee D'Aniello, 627 Tunxis Hill Rd., Fairfield, Conn.

[22] Filed: Jan. 5, 1973

[21] Appl. No.: 321,146

[52] U.S. Cl............ 33/185 R, 33/172 D, 33/174 Q, 33/147 E
[51] Int. Cl............................................. B27g 23/00
[58] Field of Search.......... 33/185 R, 172 D, 174 Q, 33/147 E, 147 G, 169 C, 181 R, 170, 165

[56] References Cited
UNITED STATES PATENTS

| | | | |
|---|---|---|---|
| 2,322,167 | 6/1943 | Shoemaker | 33/165 |
| 2,657,470 | 11/1953 | Allen et al. | 33/185 R |
| 2,807,093 | 9/1957 | Sanchez | 33/185 R |
| 3,546,781 | 12/1970 | Cox et al. | 33/185 |

FOREIGN PATENTS OR APPLICATIONS

| 121,507 | 12/1918 | Great Britain | 33/170 |
|---|---|---|---|

Primary Examiner—Louis R. Prince
Assistant Examiner—Willis Little
Attorney, Agent, or Firm—Thomas L. Tully; Arthur A. Johnson

[57] ABSTRACT

Apparatus and method for locating the true rotational axis of a spindle on a machine and for setting the tool cutting radius therefrom particularly where interchangeability and expedient use is desired on many different machines. The apparatus includes simplified fastening means which provides for immediate alignment along a coordinate axis of any machine having a mounting table with standard T-slots. A gauge probe and a measurement indicator are interfaced along the coordinate axis to measure spindle eccentricities therealong. The indicator is adapted with a specially configured pickup to compensate for interfacing misalignments along the coordinate axis. Positional adjustments for the indicator are provided by which the interface and/or reference settings may be established without disturbing the table settings of the machine. By setting the cutting radius after the tool is secured in the spindle, the method achieves precision with a single apparatus setup.

7 Claims, 6 Drawing Figures

PATENTED JUL 30 1974 3,826,011

PRE-SETTING TOOL GAUGE FOR SPINDLE MACHINES

BACKGROUND OF THE INVENTION

The present invention relates to both the apparatus and the method for locating the true rotational axis of a spindle on a machine and precisely setting the radius of cutting tools therefrom, especially where interchangeable and expedient use on various machines is desired. Hitherto, many different apparatus and methods have been used for locating the true rotational axis of a spindle on a machine and setting the cutting radius therefrom. Most apparatus and methods can only be utilized to either locate the true rotational axis or set the cutting radius and, therefore, at least two setup operations are necessary to accomplish precision machining.

Where standard gauge equipment is utilized to establish the true rotational center, the setup is very time consuming because of the precision alignment necessary to establish a reference from which measurements can be taken. Also, the fastening means of such equipment lacks the interchangeability necessary for immediate adaptation to different types of spindle driven machines. Such fastening means is usually bulky and occupies much of the machine's mounting table, so that the removal thereof is necessary to make room for the workpiece. Therefore, the use of standard gauge equipment throughout a composite of machining operations is generally precluded.

Positional adjustments for the measurement indicator are generally not included on most standard gauge equipment. Therefore, the table settings of the machine must be disturbed to establish reference settings for such equipment and this results in confusion when the table settings have been correlated to the operations performed.

SUMMARY OF THE INVENTION

It is, therefore, a general object of the present invention to locate the true rotational axis of a spindle on a machine and to set the tool cutting radius therefrom using apparatus and a method which minimize and obviate the disadvantages of the prior art.

It is a specific object of the present invention to locate the true rotational axis of a spindle on a machine and to set the tool cutting radius therefrom using apparatus which includes a self-aligning fastening means along a coordinate axis of spindle driven machines having T-slots.

It is a more specific object of the present invention to locate the true rotational axis of a spindle on a machine and to set the tool cutting radius therefrom using apparatus which measures from a convenient reference to facilitate mathematical determinations.

It is another object of the present invention to locate the true rotational axis of a spindle on a machine and to set the tool cutting radius therefrom using apparatus which is adjustable to reference settings independently of the positional adjustments on the machine.

It is a further object of the present invention to locate the true rotational axis of a spindle on a machine and to set the tool cutting radius therefrom using apparatus which compensates for interfacing misalignments along the axis of measurement.

These objects are accomplished in one form according to the present invention by utilizing a precision probe to detect and a dial indicator to measure eccentricities along a coordinate axis of spindle driven machines. The eccentricities are measured from a cylindrical tip on the probe and the radius of the cylindrical tip is predetermined for convenient use in mathematical determinations. The dial indicator is rigidly supported by a stand on which a mounting base is adapted to provide alignment means with the coordinate axis and fastening means for securing into T-slots of the machine. Positional adjustments are included on the stand for locating the dial indicator along the coordinate axis and along an axis perpendicular thereto. A stem pickup having a broad faced surface is provided on the dial indicator to compensate for interfacing misalignments along the coordinate axis.

When locating the true rotational axis, the probe is inserted into the spindle and the stand is fastened to the machine with the dial indicator interfacing against the cylindrical tip along the coordinate axis. A deviation is then recorded from the dial indicator by observing the high and low readings thereon as the spindle is rotated. The true rotational center is then known to be located perpendicularly along the coordinate axis toward the longitudinal center of the probe from the lowest reading observed, at a distance equal to the radius of the cylindrical tip minus one-half the deviation. Where adjustable tools are utilized, the cutting radius is then set by replacing the probe in the spindle with the adjustable tool. The dial indicator is then displaced from the true rotational axis along the coordinate axis by a distance equal to the desired cutting radius. The adjustable tool is then adjusted to establish an interface between the dial indicator and the cutting edge of the tool at the dial indicator setting corresponding to the true rotational axis.

BRIEF DESCRIPTION OF THE DRAWINGS

The manner in which these and other objects of the invention are achieved will be best understood by reference to the following description, the appended claims, and the attached drawings wherein:

DESCRIPTION OF THE PREFERRED EMBODIMENT

Figure 1:
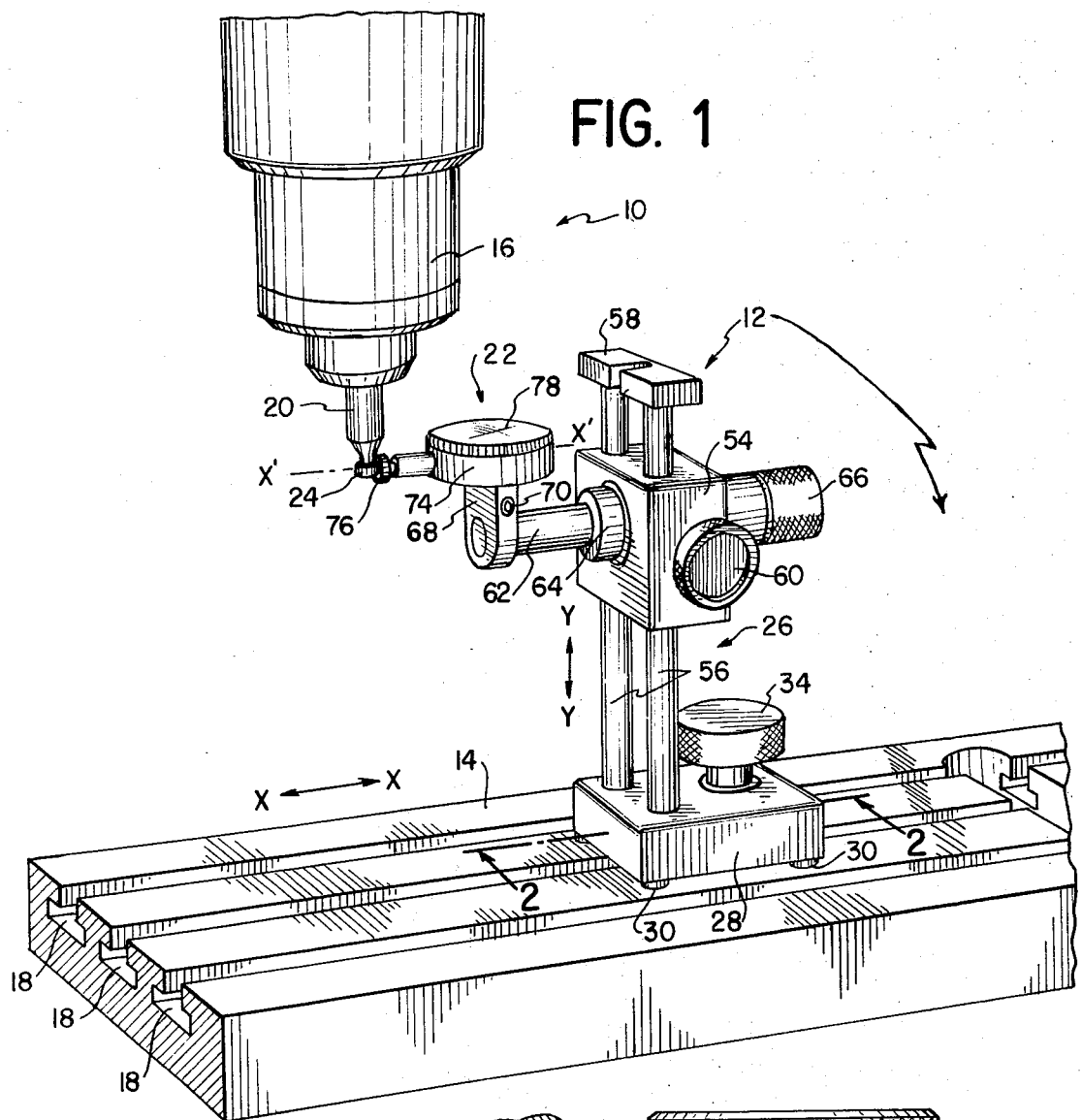
FIG. 1 is a partial perspective view of a spindle driven machine on which the measurement apparatus of this invention has been incorporated.

Turning now to the drawings, a spindle driven machine 10 incorporating the measurement apparatus 12 of this invention is illustrated in FIG. 1. Generally, the machine 10 includes a work table 14 and a spindle 16 which are interconnected through a base (not shown). Power is delivered to rotate the spindle 16 which drives a cutting tool (not shown) during the performance of machining operations on a workpiece (not shown) secured to the table 14. Positional adjustments (not shown) are included on the machine 10 for moving the table 14 and/or the spindle 16 along the axes of a coordinate system. T-slots 18 are disposed on the table 14 in a direction parallel to a coordinate axis X—X of the machine 10 and are commonly utilized for securing the workpiece. The coordinate axis X—X is disposed perpendicularly to the rotational axis of the spindle 16.

The measurement apparatus consists generally of a probe 20 and a detecting means 22 for measuring distances along a measurement axis X'—X'. The probe 20 is cylindrically shaped and the cylindrical surfaces thereof are concentric about the cylindrical axis to a precision tolerance, such as fifty-millionths of an inch (0.000050 inch). At one end, the probe 20 is configured to insert into the spindle 16 and at its other end, a cylindrical tip 24 is disposed. Although the surface of the cylindrical tip 24 may be disposed on any suitable radius of precision tolerance, mathematical calculations are facilitated by a radius of one-tenth of an inch (0.1 inch). The detecting means 22 is mounted on a stand 26 which in its simplest form is structured to orient the measurement axis X'—X' parallel to the coordinate axis X—X of the machine 10.

Figure 2:
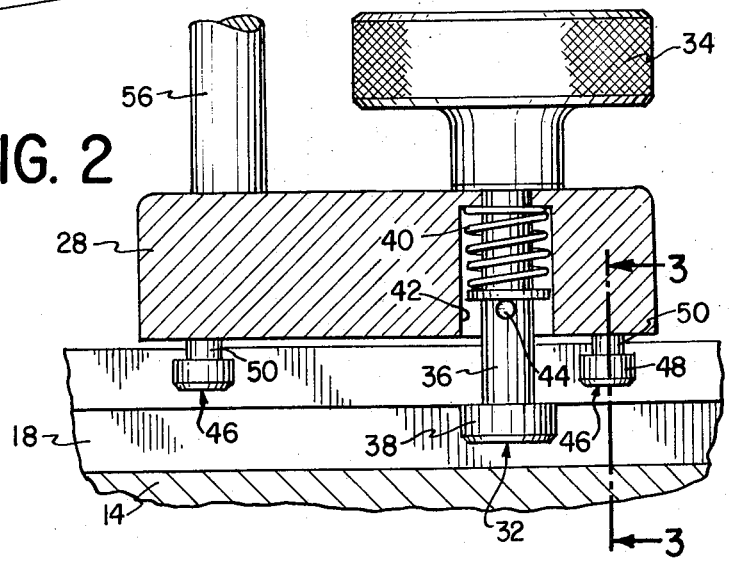
FIG. 2 is an enlarged sectional view thereof, taken substantially along line 2—2 of FIG. 1 to illustrate the self-aligning fastening means utilized for securing the measurement apparatus to the machine.

As illustrated in FIG. 2, the stand 26 includes a mounted base 28 on which bearing pads 30 are affixed at each corner to support the stand 26 from a bearing surface in a plane parallel to the measurement axis X'—X'. A fastening means for securing the stand 26 into the T-slots 18 of the table 14 is provided by passing a bolt 32 through the mounting base 28 and into a knurled knob 34. The bolt 32 has a stem 36 sized to fit within the throat of the T-slots 18 and a head 38 configured to fit within the cross portion of the T-slots 18. A spring 40 is disposed about the bolt 32 and is retained within a counter bore 42 in the mounting base 28 by a pin 44 which passes through the bolt 32.

Figure 3:
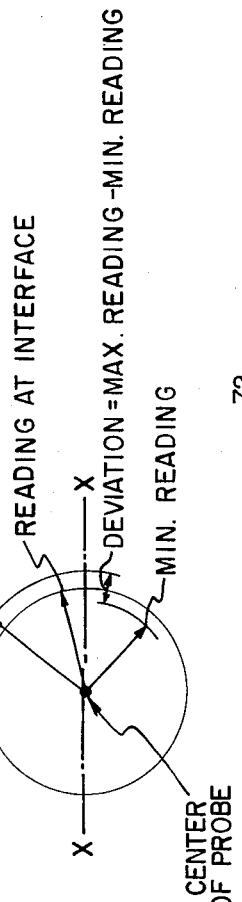
FIG. 3 is a sectional view thereof taken substantially along line 3—3 of FIG. 2 to illustrate the cooperation existing between the T-slots of the machine and the fastening means.

An alignment means for orienting the measurement axis X'—X' with the longitudinal axis of the T-slots 18 is incorporated into the fastening means. This is accomplished with cylindrical alignment studs 46 each of which has a key head 48 and a stem portion 50 of precision concentricity about a longitudinal axis. The diameter of each key head 48 is of precision magnitude and is complementary to the throat width of the T-slots 18. The studs 46 screw into the mounting base 28 and are aligned with the bolt 32 along a common axis thereon with each stem portion 50 disposed into a counter bore 52 of precision diameter, as illustrated in FIG. 3. The common axis is arranged across the mounting base 28 in a direction parallel to the measurement axis X'—X'.

Where the added expense can be borne, positional adjustment means for moving the detecting means 22 relative to the coordinate axis X—X of the machine 10 can be incorporated into the stand 26. As illustrated in FIG. 1, motion along the coordinate axis X—X is achieved by incorporating a first adjustment means for moving the detecting means 22 along the measurement axis X'—X' through a housing block 54 which is disposed on guide posts 56 extending from the mounting base 28 to a bridge block 58. By providing for movement of the housing block 54 along the guide posts 56, a second adjustment means for locating the detecting means 22 along an axis Y—Y in a direction perpendicular to the coordinate axis X—X can be incorporated. This movement is accomplished by disposing a rack (not shown) on one of the guide posts 56 and engaging the rack with a pinion (not shown) which is rotated from a knob 60.

Both fine and coarse adjustments are included in the first adjustment means by slideably mounting a slow travel ram 62 coaxially through a fast travel ram 64. The slow travel ram 62 is actuated telescopically within the fast travel ram 64 by a standard micro movement (not shown) which is manipulated from a thimble 66. The detecting means 22 is affixed to the slow travel ram 62 with the measurement axis X'—X' aligned parallel to the longitudinal axis thereof. Any suitable means can be utilized to achieve this affixment, such as a collar 68 which is tightened about the slow travel ram 62 with a screw 70. The fast travel ram 64 includes a rack (not shown) along its longitudinal axis and is slideably retained through the housing block 54. A pinion (not shown) engages the rack and is rotatable from a knob 72 (shown in FIG. 4) to actuate the fast travel ram 64 along its longitudinal axis.

Figure 4:
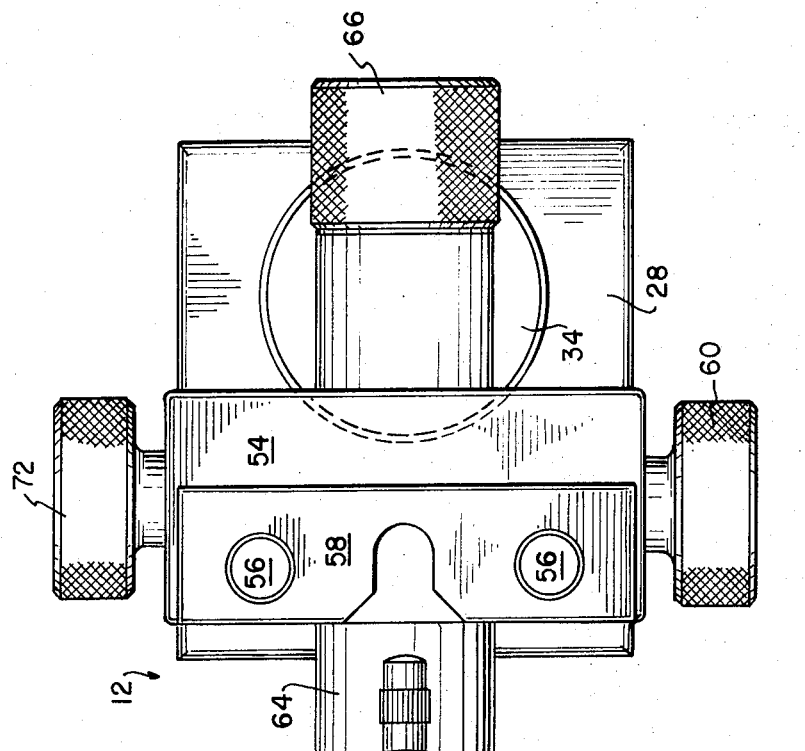
FIG. 4 is an enlarged plan view thereof illustrating the interface accomplished between the precision probe and the dial indicator along a coordinate axis of the machine.

Any suitable measurement device could be utilized as the detecting means 22, however, as illustrated in FIG. 4, a dial indicator 74 is particularly appropriate. The dial indicator 74 proportionately translates the linear movements of a stem pickup 76 along the measurement axis X'—X' to the angular movements of a dial 78. Measurements are observed from a scale fact 80 disposed under the dial 78 and a transparent cover 82 encloses the dial 78. The scale face 80 is rotatably mounted within the dial indicator 74 and can be turned to establish reference settings by rotating the transparent cover 82. The stem pickup 76 is specially configured to present a flat surface 84 perpendicularly across the measurement axis X'—X' and the flat surface 84 is hardened to preclude wear.

In use the stand 26 can be fastened to the table 14 very quickly by loosening the knurled knob 34 which causes the head 38 of the bolt 32 to extend from the mounting base 28 due to the bias of the spring 40. Then the studs 46 are aligned into any selected T-slot 18 and the stand 26 is positioned at any desired location therealong by sliding it across the table 14. At the desired location, the knurled knob 34 is tightened to secure the stand 26 on the table 14 with the measurement axis X'—X' of the dial indicator 74 aligned with and parallel to the coordinate axis X—X of the machine 10.

Rotary eccentricities of the spindle 16 about a true rotational axis perpendicular to the coordinate axis X—X of the machine 10 can be readily determined with the measuring apparatus 12. To achieve this, the probe 20 is first secured into the spindle 16 and the stand 26 supporting the dial indicator 74 is fastened to the table 14 at a location in close proximity to the probe 20. As illustrated in FIG. 4, the flat surface 84 on the stem pickup 76 is then inferfaced with the cylindrical tip 24 of the probe 20 along the coordinate axis X—X of the machine 10. Due to the structural configuration of the stand 26, the flat surface 84 aligns perpendicularly across the coordinate axis X—X and, therefore, its width is effective to interface the probe 20 with the dial indicator 74 when a misalignment exists therebetween along the coordinate axis X—X. In establishing this interface, the stem pickup 76 is depressed linearly along the measurement axis X'—X' by at least the distance of the anticipated eccentricity. If the positional adjustment means have been incorporated on the stand 26, the interfacing can be accomplished by manipulating the thimble 66 and/or the knobs 60 and 72, otherwise the positional adjustments on the machine 10 are utilized for this purpose.

Figure 5:
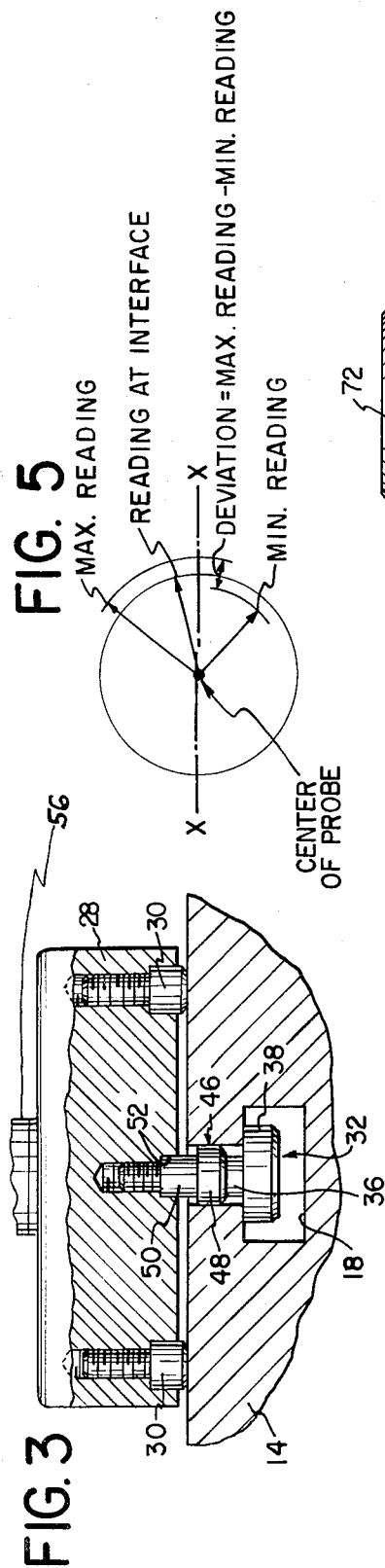
FIG. 5 is a visual diagram illustrating the measurements observed on the dial indicator in determining the eccentricity of the spindle.
Figure 6:
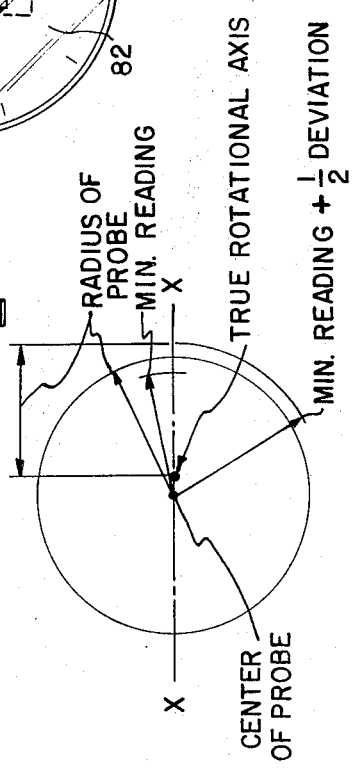
FIG. 6 is a visual diagram illustrating the mathematical use of the measurements to locate the true rotational axis.

The spindle 16 is then rotated through at least one revolution and the maximum and minimum readings on the dial indicator 74 are observed during rotation. As illustrated in FIG. 5, the difference existing between the maximum and minimum readings constitutes a deviation along the coordinate axis X—X. Since the probe 20 is of precision concentricity about its longitudinal axis, this deviation can only be attributed to the rotational eccentricity of the spindle 16. Therefore, as illustrated in FIG. 6, the true rotational axis is known to be located perpendicularly along the coordinate axis X—X, at a point removed from the minimum reading by a transfer distance equal to the radius of the cylindrical tip 24 minus one-half of the deviation. The true rotational axis can then be established as a reference setting on the dial indicator 74 or correlated as a setting on the positional adjustment of the machine 10 along the coordinate axis X—X. Of course, the radius of the cylindrical tip 24 on the probe 20 must be correlated with the linear depression of the stem pickup 76 along the measurement axis X'—X' when establishing the true rotational axis as a reference setting on the dial indicator 74 and any discrepancies therebetween must be compensated for with either the first adjustment means or the positional adjustment of the machine 10 along the coordinate axis X—X. Where the radius of one-tenth of an inch is utilized for the cylindrical tip 24, establishing this reference setting is greatly facilitated due to the compatibility then existing with the calibration scales normally used on the dial indicator 74 and the positional adjustments of the machine 10.

Where cutting tools operable at an adjustable radius are utilized, such as boring chucks, the cutting radius can be set from the true rotational axis, to thereby enhance the precision of machine operations. This is accomplished by utilizing the measurement apparatus 12 to determine the spindle eccentricities as described above and thereafter correlating the true rotational axis to a reference setting on the dial indicator 74. Then the probe 20 is removed from the spindle 16 and replaced therein by the cutting tool. The reference setting is then displaced along the coordinate axis X—X by a distance equal to the cutting radius desired. This can be accomplished by manipulating either the first adjustment means or the positional adjustment on the machine 10 along the coordinate axis X—X. The cutting edge on the tool is then interfaced with the flat surface 84 of the stem pickup 76 along the coordinate axis X—X to reestablish the reference setting on the dial indicator 74 by manipulating the adjustable means on the tool.

Due to the compact size of the measurement apparatus 12, as compared with conventional gauging equipment, it may remain on the machine 10 throughout a composite of machining operations in many applications. Even where space limitations necessitate that the measurement apparatus 12 be removed before machining operations are performed, its self-aligning fastening means provides for expedient setup whenever spindle eccentricity must be found or tool settings are to be made on the machine 10.

Those skilled in the art should readily appreciate that the apparatus and the method embodied by this invention can be utilized to locate the true rotational axis of a spindle on a machine and to set the adjustable cutting radius of a tool therefrom. Also, the apparatus is self-aligning on a coordinate axis of the machine and is adapted to compensate for interfacing misalignment therealong. Furthermore, reference settings can be adjusted on the apparatus independently of the positional adjustments on the machine and measurements are taken from a convenient reference to facilitate mathematical determinations.

It should be understood that the present disclosure has been made only by way of example and that numerous changes in details of construction and the combination or arrangement of parts may be resorted to without departing from the true spirit and scope of the invention and, therefore, the present disclosure should be construed as illustrative rather than limiting.

What I claim is:

1. An apparatus for locating the true axis of rotation of a spindle of a cutting machine and for accurately positioning a cutting tool within the spindle relative to the true axis of rotation thereof, said cutting machine having a table having a surface which is precision adjustable relative to said axis of rotation and which is provided with T-slot channels, said apparatus comprising a base for mounting said apparatus on said table, fastening means on said base adapted for locking engagement within said T-slot channel, alignment means to align said base parallel to the longitudinal axis of said T-slot channel, a guide post attached to and extending from said base, a housing block adjustably attached to said guide post, means for adjustably moving said housing block along said post towards and away from said base, an indicator element adjustably attached to said housing block, means for adjustably moving said indicator element relative to said housing block in a direction parallel to said table, said indicator element having a feeler adapted to contact the surface of a precision probe inserted within the spindle of said machine and to locate the true axis of rotation of said spindle on said indicator element during rotation of said probe, dial means on said indicator element providing a visual indication as said spindle rotates of the deviation of said true axis of rotation from the center of said probe, which visual indication permits the accurate positioning of a cutting tool within said spindle relative to the true axis of rotation of said spindle.

2. An apparatus according to claim 1 in which said fastening means comprises a bolt having a head adapted to fit within the cross portion of said T-slot channel, a stem adapted to fit within the throat of said T-slot channel and to pass through said base, and a nut adapted to be tightened against said base to secure said apparatus to said table.

3. An apparatus according to claim 1 in which said alignment means comprises at least one cylindrical element extending from the underside of said base and having a precise diameter corresponding to the throat width of said T-slot channel, said element being aligned along a common axis with said fastening means.

4. An apparatus according to claim 1 in which said feeler has a flat surface which is parallel to the axis of rotation of the spindle.

5. An apparatus according to claim 1 in which said means for adjustably moving the housing block along the guide post towards and away from said base comprises a pinion in said housing block which engages a rack on said guide post, and means on said housing block for rotating said pinion to adjustably move said housing block along said guide post.

6. An apparatus according to claim 1 in which the means for adjustably moving said indicator element relative to said housing block comprises a slow travel ram to which said indicator element is attached and which is slidably retained coaxially through a fast travel ram and is actuated by micro movement, said fast travel ram being slidably engaged within said housing block and comprising a rack which engages a pinion within said housing block which pinion is rotatable by means of a knob on said housing block to adjustably move said indicator element relative to said housing block.

7. A method for locating the true rotational axis of a spindle of a cutting machine and for accurately positioning a cutting tool within the spindle relative to the true axis of rotation thereof, said cutting machine having a table having a surface which is precision adjustable relative to said axis of rotation and which is provided with T-slot channels, comprising the steps of:

a. securing a cylindrical probe having a precise known radius into said spindle, b. positioning a detecting means device on the surface of said table, said device comprising a base, a guide post extending therefrom, a housing block adjustably movable along said guide post in a direction perpendicular to the surface of said table and an indicator element adjustably attached to said housing block for movement in a direction parallel to the surface of said table, c. securing said device to said table by engaging said base within a T-slot channel of said table, d. moving said housing block along said guide post until the height of said indicator element above the surface of the table corresponds to the location of said probe, e. moving said indicator element relative to said housing block in a direction parallel to the surface of said table to bring the feeler of said indicator element into contact with the surface of said precision probe and continuing said movement until a visual reading appears on said indicator element corresponding to the known precise radius of said probe, f. rotating said spindle and precision probe to locate the center point between the highest and lowest visual readings on said indicator element and marking said center point on the indicator element as a reference point corresponding to the axis of rotation of said spindle, g. moving said precision adjustable table having said detecting means device secured thereto a precise distance from its original position setting corresponding to the radius of the cut to be made, h. replacing said probe in said spindle with a cutting tool, i. precisely positioning said cutting tool by moving the tip thereof into contact with said feeler and continuing said movement until the visual reading appears on said indicator element corresponding to the axis of rotation of said spindle, and j. securing said cutting tool in position.

\* \* \* \* \*